United States Patent [19]
Reck

[11] 3,874,236
[45] Apr. 1, 1975

[54] VIBRATION METHOD AND APPARATUS FOR MEASURING THE LEVEL OF MATERIAL IN A CONTAINER

[75] Inventor: Martin Reck, Ludwigsburg, Germany

[73] Assignee: Fabrik fur Pat, Sicherheits-Roster G. W. Barth, Ludwigsburg, Germany

[22] Filed: Jan. 22, 1973

[21] Appl. No.: 325,366

[30] Foreign Application Priority Data
Jan. 22, 1972 Germany............................ 2203081

[52] U.S. Cl. ............................... 73/290 V, 137/391
[51] Int. Cl. .......................... G01f 23/00, G01f 23/28
[58] Field of Search ......... 73/290 V, 71.5, 67, 67.2, 73/517 AV, DIG. 1; 137/386, 391

[56] References Cited
UNITED STATES PATENTS
3,106,838 10/1963 Crooks................................. 73/67.2
3,133,442 5/1964 Werner............................. 73/290 V
3,372,592 3/1968 Gravert............................ 73/290 V
3,540,275 11/1970 Post et al.......................... 73/290 V
3,603,149 9/1971 McKown........................... 73/290 V

*Primary Examiner*—Richard C. Queisser
*Assistant Examiner*—Daniel M. Yasich
*Attorney, Agent, or Firm*—Murray Schaffer

[57] ABSTRACT

The method and apparatus for measuring the level of material in a container wherein a rope is stretched under constant tension between an anchor in the container and a fixed point. The level of material in the container surrounds the rope leaving a free portion above it. The length of the free portion varies directly to the amount of material in the container. The rope is excited and caused to vibrate and the responses of vibration such as wave length, amplitude and frequency are sensed and measured. These responses vary with respect to the length of the rope and therefore the measurement obtained is in direct proportion to the amount of material in the container.

27 Claims, 3 Drawing Figures

VIBRATION METHOD AND APPARATUS FOR MEASURING THE LEVEL OF MATERIAL IN A CONTAINER

The present invention relates to a method and apparatus for measuring the differences between a given point and a variable level and particularly to a method and apparatus for determining the level of material in a hopper or storage device.

Various techniques for determining the contents of storage containers have been known wherein the difference between a fixed or predetermined point in the container and the variable upper surface of the material is measured. From this difference, a direct or indirect conversion of the height and consequently that of the volume of the contents in the container can be made and shown. There are many measuring methods, but noe are universally applicable. This is a particular problem when handling containers which have to be periodically or continually refiled since it is difficult to continously determine the level of the material in the container to determine, for example, the particular time to refill the container.

Capacitive level indicators are known in which a metal probe is inserted into the container to be monitored. The material filling the container covers the probe to a more or less degree relative to the capacity of the container and thus changes the capacitance of the probe. This change in capacitance is a direct measure of the varying content. The indicating device can therefore be calibrated directly on the height and consequently the volume of the container. While this type of indicator permits the continual computation of the level at which the contents fill the container, it is however suitable only for fluid material and comparable loose or cominuted material whose physical characteristics change only in a negligable amount once in the container.

Ultrasonic gate devices have also been used to determine the level of material in a container. The conventional employment is such that an ultrasonic gate is placed so that it monitors either the maximum or minimal point of the content level in the container whereby the interruption of the gate, that is the freeing of the ultrasonic beam through the material produces a release of the indicator and/or the production of a control signal. A disadvantage of this method lies in the fact that the ultrasonic gate cannot be placed in position where it may be inadvertently interrupted by the material refilling the container, since in such case a false indication is obtained. The method may also be carried out with an ultrasonic beam which may be directed onto the material from a given position or fixed measuring point outside of the container so that the beam is reflected from the top surface of the material. This reflected beam is directed to a receiver and the distance computed as a function of the run between the fixed point and the receiver. This computation is made with the help of the frequency of the ultrasonic wave. This computation can be made through a conventional converter and time measuring instruments so that the height of the filling material in the container and therefore the volume for the container can be correspondingly derived as an indicating electric signal. It will be obvious that great difficulty lies in this method, since dependence is made upon the reflection of the ultrasonic beam from the surface of the material. The composition of the material critically effects deviation of the reflection and the reflection generally does not provide a sufficient quality level for measurement. This is a particular problem when the material in the container varies in depth through a very wide range or when the composition of the material has a particularly kernel or particulate consistency. As a result it is very difficult to obtain a suitable ultrasonic impulse. Another source of difficulty arises when the beam of the ultrasonic device is very strongly focused. Under these conditions it is most difficult to obtain a reflected impulse from material which is not a false reading. It will therefore be obvious that these techniques can only be used in very few instances.

It has also been known to employ a level sensing indicating device in which a feeler mechanism tied at the end of a rope is periodically inserted into the container and then withdrawn from it. When the fealer rests on the upper surface of the material then the length of the rope can be taken as the measurement of the distance in the container. Generally, the rope is measured from a given point, usually a pulley which is operated by electro-mechanical means to raise and lower the feeler. Consequently, because of the electro-mechanical means, the apparatus is not operatively trustworthy and does not provide a uniform and secure monitoring of the material. A further disadvantage of this known apparatus lies in the fact that the feeler often sinks into the material in the container, particularly when the composition of the material does not present a suitably hard upper surface. Because of this, accuracy of the measurement can not be obtained. In addition, continual measurement of the material in the container is not possible since the feeler element must be periodically removed from the container particularly when it is refilled, otherwise it would be buried under the material. In addition, the individual steps needed in this operation take a great deal of time.

It is an object of the present invention to provide an improved method and apparatus for the measurement of material in a container.

It is a further object of the present invention to provide method and apparatus for measuring the amount of material in a container wherein the difference between a fixed given amount and a changeable amount in the container can be determined.

It is a further object of the present invention to provide a method and apparatus of the type described which is independent of the composition of the material and which provides a quick and continuous measurement of the material in the container.

It is a further object of the present invention to provide a method and apparatus for accurately and securely measuring cominuted material, pulverized material and particulate material and the like in a container.

It is a further object to provide apparatus which does not require the continual attention of an operator to carry out the measurements.

According to the present invention, a method for the measurement of the distance between a given point and a variable point particularly during the filling of and/or emptying of a container is provided comprising the steps of stretching a rope under constant tension through the material in the container between an anchor in the container and a fixed point exterior of the level of the material. The rope provides a free portion or length not in contact with the material. This free length is excited to be caused to oscillate and wave. The relative variations in vibration etc. are sensed at a fixed point. The frequency of the oscillation and/or the length of the oscillating wave etc. responsive to the excitation is dependent upon the distance between the fixed point and the surface of the material, which distance varies as a result of the changing level of material. Thus the responses to the excitation are indicative of the height of the material in the container, that is indicative of either the distance from the surface of the material to the anchor or to the fixed point.

An apparatus for carrying out the present invention is characterized by the stretching of a rope under constant tension between an anchor in the container and a fixed reference point remote therefrom past a fixed sensing position. The rope extends through the container which is filled with a constantly changing volume of material. The level of the material creates a constantly changing surface level and therefore a constantly changing free portion which in turn creates a variable tension point about the rope intermediate the anchor and the fixed end. This variable tensioning point changes the length of the free portion of the rope. An excitement unit is provided to cause the free end of the rope to oscillate and/or wave and a measuring device is arranged with respect to the swinging portion of the rope. The measuring device is provided with sensing means for sensing the relative response of the rope to the excitement (that is, the resonance frequency of oscillation, the wave length and/or amplitude of the wave or the like), and to convert this response into digital and/or analog read-outs corresponsing to the distance between the variable portion of the material to either the anchor or to the remote fixed reference point or to the sensor itself.

Full details of the preferred embodiments of the present invention are to be seen from the attached drawings and from the following description in which the drawings are referred.

Figure 1:
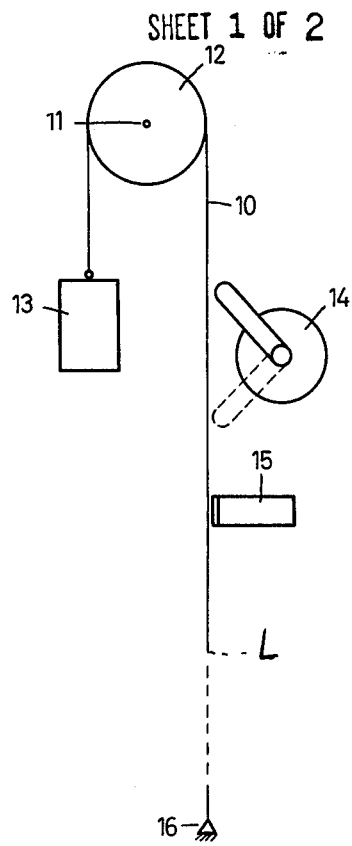
FIG. 1 is a schematic view of the apparatus of the present invention.

Before turning to the specific utilization of the present invention, a discussion of the general nature and detail of the measuring device will be made. As seen in FIG. 1, the measuring device comprises a rope 10 capable of being placed under tension. The rope may be a string, thread, chain, wire or cable capable of being vibrated. One end of the rope 10 is held fixed at an anchor point 16 and the rope passes over a pulley 12 rotatable about an axis 11. The free end of the rope is fastened or tied to a weight 13 which places the rope under a predetermined tension. The pulley 12 is spaced above the anchor 16 so that the rope 10 has a length between the anchor and pulley which is substantially vertical. The rope may of course be tied to the pulley and the pulley turned by suitable ratchet and pawl means to wind the rope into proper tension. In any event it will be obvious that the tangential point of rope 10 on pulley 12 constitutes a first fixed end for the rope while the anchor 16 constitutes a second fixed end.

At this stage, it is to be noted that the anchor 16 is preferably located at the bottom of a container in which material is stored and into which and out of which material may be continuously or periodically transferred. The rope 10 thus passes through the container and is in part surrounded by the material therein (indicated by the dotted line portion) and in part is free (indicated by the solid line portion). The letter L denotes the variable level of material which point of contact with the rope constitutes a variable reference point. The ratio of the "free rope length" to the entire rope length or even to the surrounded rope length is dependent only upon the height of the material in the container. A rope held under tension between fixed reference points has a normal oscillation when excited. However, as the variable reference point L moves, that is the material rises or lowers in the container, the oscillation produced will vary from this otherwise normal condition to produce a relative oscillation of its own. The relative oscillation can be measured or sensed at any point along the free length of the rope. The sensing point, is preferably fixed at a desired position and may be located at the tangent point to the pulley 12 or at a point somewhere between it and the level of the material. Preferably according to the present invention between the two extremes and at this point a sensor 15 is fixed. The point actually depends upon the selected method of exciting the rope and/or upon the read-out or evaluation system employed.

The establishment of a relative oscillation in any section of the rope can be increased if, instead of a rope having a round or square cross section, the rope is made from a thin band or flat strip of material which has a wider face than thickness.

In order to excite the rope 10, a hammer device 14 is provided which in periodic short intervals deflects the rope transversely to its direction of tensioning (i.e. its length). The waves created in the rope travel over the free length of the rope in a predetermined relationship which depends upon the pulley tension and the cross section of the rope. A wave travels along the free length of rope until it is stopped by the surface of the material and a harmonic wave corresponding to it is reflected from the level of the material along the free rope length. Both the wave generated by the hammer 14 and the reflected wave pass the sensing point established by the sensor 15. From the running or elapsed time between the generated and reflected wave one can determine or calculate the distance between this sensing point 15 and the level L of the material, even if the level varies. The difference in time between the generated wave and the reflected wave is directly proportional to twice the distance between the sensing point 15 and the variable level L of the material. Since the rope has for each unit length a predetermined dampening characteristic, this distance may be calculated also by determining the ratio of amplitude of the two waves.

In addition, it is possible to obtain a direct indication of the content level as a result of this measuring data. To accomplish this, it is only necessary that the maximum extent of the "free rope length" between the sensing point 15 and the anchor 16 be made to correspond to the empty condition of the container; that is the anchor 16 be located at the bottom and the sensing device at the top of the container. The indicated value is therefore obtained from the variance in the total maximum free length. In this connection the result can be calculated to the actual amount of material in the container, or the amount of material still missing from the container, without the need of converting or making any change in the measured value.

Figure 2:
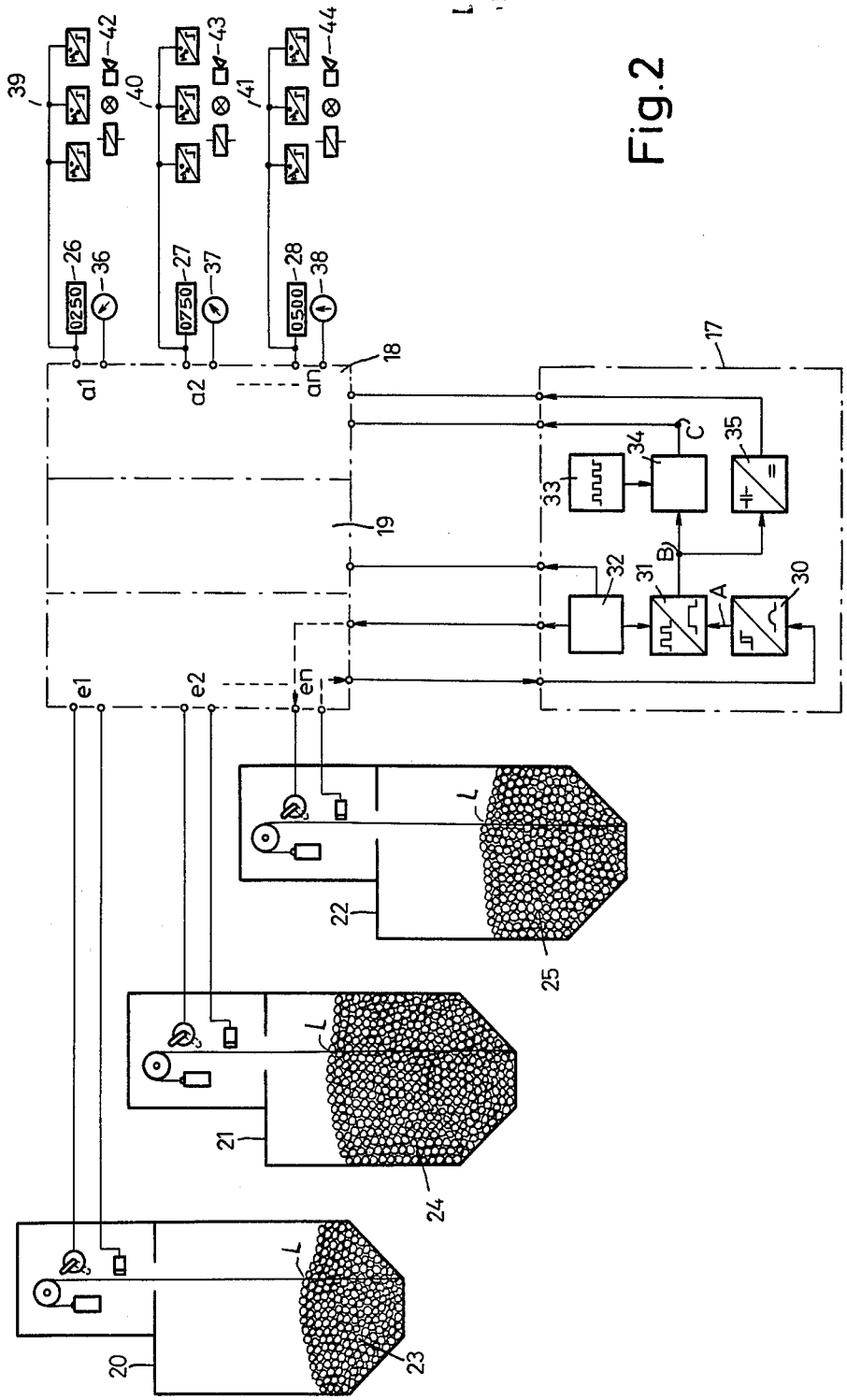
FIG. 2 is a view of several containers each employing the apparatus of FIG. 1 and also showing the computer and analyzing system.

The application of the present invention to a specific embodiment is shown in FIG. 2. Here a measuring device as seen in FIG. 1 is arranged with respect to each of three containers 20, 21 and 22. Each rope is provided with a hammer mechanism and a sensing and measuring system, for example in the form of an inductive sensor, transducer or wire strain gauge. The anchor or lower end of the rope is fixed at the lowest point of the container to indicate the maximum "empty" condition.

The containers are each partially filled with material 23, 24 and 25 respectively, each to a level L wherein a portion of the tensioned rope is surrounded thereby permitting only a relative oscillation to occur. The sensors are placed at each sensing point above the top of the container at a distance which is uniform and remains constant from the bottom of each container. Thus the reference length of the "free rope length" varies in dependence upon the level of the material 23, 24 and 25 in the respective containers and their distance from point L to the sensing point 15 can be calculated.

The calculating or computing system comprises a selector switch 19 regulated by a central control device 17. Each sensor and hammer mechanism (at points 15) is respectively connected to the input section of the selector switch 19 by input lines el – en (depending on the number of containers). The output section 18 of the selector switch comprises a corresponding series of outputs al – an which are synchronously arranged with the control device 17.

Figure 3:
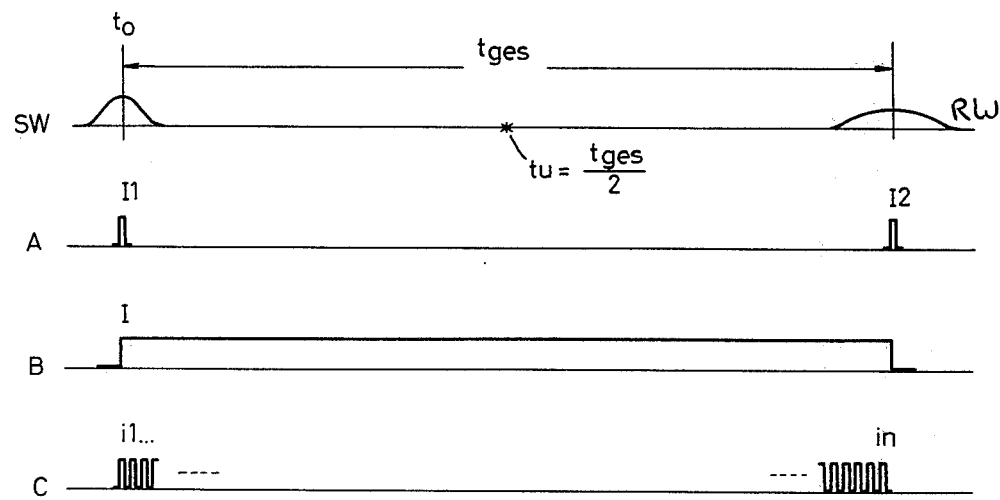
FIG. 3 is a diagram of the signals and impulses found in carrying out the computation and analysis by the means shown in FIG. 2.

The control device 17 includes a programer 32 which controls the selector switch so that the hammer mechanism associated with the respective sensor may be manipulated. Upon manipulation of the tensioned rope, the rope is oscillated and creates a wave SW as seen in FIG. 3. The selector switch 19 may also regulate the operation of the sensor, to actuate it either for continuous sensing of the vibration of the rope or for the periodic sensing. As the generated wave passes the sensing point 15 at the instant to, it instantaneously induces the sensor to generate an electric impulse. The sensor may be any one of the aforementioned types of transducers, strain gauges, inductive signal generators, capacitance devices etc. Preferably the rope section corresponding to the position of the sensor is ferromagnetic and the sensor is some sort of inductive signal generator.

The generated impulse from each sensor passes through the respective input el to en to an impulse or wave former 30 (FIG. 2) where it is converted to a square wave control signal I1 of constant amplitude, (Curve A, FIG. 3). The control signal passes (A in FIG. 2) to a flip-flop switch 31 which is synchronized through the programmer 32 with the selector switch 19 for regulated or synchronized release. The release time can be limited to a desired maximum evaluation time for each measuring position. After the flip-flop 31 is switched it produces an output B comprising an elongated square wave I (curve B FIG. 2) which passes to a stepping register 34. The stepping register 34 receives a continual timing or clock pulse from a timing generator 33 whose impulse period is set at a desirably significant small interval. The output signal B produced by the flip-flop 31 preferably although not necessarily also passes to an analog computer 35 having a memory storage condenser. The counter 34 produces a digital read-out comprising a series of square wave clock signals i1 to in (curve C FIG. 3) while the analog computer 35 produces a more visual determination. The number of signals in the digital read-out or the analog read-out depends on the interval Tges. This interval Tges is determined when a second electric impulse is induced in the sensor by a reflected oscillation RW on the rope from the level L of the material 23, 24 or 25 in the respective container. This reflected wave produces a control signal I2 (curve A FIG. 3) which reverses the flip-flop 31 ending the elongated signal I (curve B FIG. 3). The ending of signal I ends the loading of the condenser in the analog computer 35 and releases the stepping register 34. The computer 35 thus produces a value in the condenser, as the register 34 produces simultaneously a count which is directly indicative of the actual height of the material in the container. The apparatus thus produces a simultaneous analog and digital reading of the level of the material contents in the container.

As is seen in FIG. 3, the interval Tges between the generated wave SW and the reflected wave RW is proportional to double the distance along the free length of the rope from the sensing point to the level of the material in the container. This measured interval Tges is also related to the half point $Tu = Tges/2$ which point can be obtained by read-out of the impulses in the timing generator 33. Since the time is a measure of length between the fixed sensor and the variable level of material, if the sensor is placed at the uppermost possible level of the container, the indicated half-value is therefore a direct measure of the missing portion of the container relative to its full condition. Thus it is possible to measure the missing portion of the container rather, than the actual material content of the container. Indirect measure can be effected by other means.

By manipulation of the stepping register, the time measurement of the actual value of material relative to the empty condition of the container can be obtained. The stepping register can be regulated to index backwardly from a predetermined end value which end value is initially set to correspond to the maximum distance between the sensing point 15 and the anchor 16 at the bottom of the container. Thus, as the material fills the container, the picked-up measured value obtained at the register 34 or computer 35 corresponds only to the difference between this maximum and the actual "free rope length", and the deducted output is subtracted from the predetermined end value. This difference is of course proportional to the length of the rope which is surrounded by the material in the container. Consequently, at the end of the measuring period, the stepping register 34 stands at a value in direct proportion to the material actually in the container. Similarly, the analog computer 35 can be made to shift from a given end value and reduce therefrom to show a value proportional to the end value.

In any event the measured digital and/or analog signal obtained by the stepping register 34 or the computer 35 is passed via outputs al – an respectively to a digital read-out device 26, 27 or 28, and to an analog indicator (meter, clock etc.,) 36, 37 and 38 associated with each container. In order that the central control unit 17 may be fully employed to establish its comparison function, the read-out device and analog indicator are provided with storage means, for holding the successive value until further sensing is made. In this way the successive reading of several generated wave values, reflected wave values etc., can be made under proper regulation of the control portion 17.

Each output $a1 - a2$ is connected to one or more control devices 39, 40, and 41 to provide oral and visual indication or control of succeeding operation, either to fill or empty material into or out of the containers, or control other operating functions, such as conveyor systems etc., For example, the devices can be a relay, lamp and horn, shown at 42, 43 and 44.

The excitation or deflection of the rope can be obtained by other means than the mechanical hammer shown. For example, an electromagnet may be placed in association with the ferromagnetic rope. The electromagnetic is then subjected to an alternating current to induce a variable flux in the magnetic field which would excite the rope causing it to oscillate. The frequency of oscillation would be changed until the "free rope length" is caused to swing. The resonance frequency of the "free rope length" is an index of the distance measure. The "free rope length" is thus obtained as measure of the distance between the changing point at the level of the material and the second fixed tension point outside the container, that is the pulley.

Various changes, embodiments and modifications may be made, both in carrying out the method of the present invention and in providing the specific structural form of the apparatus.

The novel method exploits only the changes in the length of free portion of the rope as affected by the height of the material, in that the relative vibration of the tensioned rope varies more or less in dependence upon the actual level of the material in the container and not on the material itself. From the relative vibrations produced by the free rope portion, it is possible to continually monitor the difference between the fixed sensing point and the level of the material in the container. Highly accurate and operational secure electronic apparata can be used to monitor these relative changes in vibration. The method is not disturbed by the continual or even periodic filling of the container by the material and replenishing of the container is therefore possible at any time, since the rope is preferably placed in a position in the container where it is not in the way of the filling material and since the cross section of the rope is small, this presents no problem. Further, sensing of the level of the material in the container is independent of the characteristics of the material, since the horizontal working component of the material on the rope exists only at the surface of the material. The position of the surface of the material with respect to the rope, varies the rope length so that the created relative vibration itself varies corresponding to the level of material itself.

The sensing of the responses of the rope to excitation can be carried out by many ways. For example, the free end of the rope can be continuously excited and from the relative vibrations thereby produced the distance between the variable level of the material and the sensing point or the fixed reference points can be obtained. It is not necessary to continuously excite the free rend of the rope but it may be only periodically excited and the relative vibration may be taken at those times. This latter method is particularly suitable for large industrial installations having more than one container to monitor. To this end a time division multiplex evaluation and computing system, wherein the transmission of two or more signals can be made simultaneously over a common path, may be fed from each of the containers to a central computer.

With the new method herein disclosed it is even possible to obtain a resultant end signal which is related to either the null or empty condition of the container or its maximum or full condition. This can be achieved since the relative vibrational response of the rope permit the distance between the fixed sensing point and the variable level of material, or the distance between the level of the material and either the anchor or the exterior tension point to be selectively determined. Thus either the portion of the rope surrounded by the material or the free rope portion can be determined. In the first instance the sensing point can be arranged at the exterior tensioning point and the response to the excitation, such as the resonance frequency measured. Thus the length of the free rope portion itself is measured, which measurement is directly proportional to the distance from the tensioning point to the variable level of the material itself. In this technique it is preferred that at least the portion of the rope correspondingly associated with the sensor be made of ferrmagnetic material and that it be arranged in an alternating magnetic field whose excitation frequency may be made to vary between a minimum and maximum value. By causing the excitation frequency of the field to correspond to the apparent resonance frequency of the free rope portion, the introduced excitation frequency itself may be used as the frequency measure of the apparent oscillation of the rope. Thereby the total measuring range is provided, as will be obvious, wherein the frequency range of the electromagnetic alternating field may be matched to the maximum changeable range of the free rope portion so that accurate correspondence can be made.

The measuring can be obtained also by arranging the sensing point and sensor offset along the rope length from the exterior fixed tensioning point. Thus the length of free rope portion can be excited to generate a wave, which is transmitted along the rope until it meets the level of the material, from which it is reflected in a contrary moving direction. The elapsed time between the sensing of the generated wave and the sensing of the reflected wave is a function of the distance between the sensor and the variable level of the material. Instead of determining the elapsed time, a sensor capable of determining the dampening of the wave as it is reflected can also be used. This method thus makes use of the relative amplitude of the waves and the fact that a uniform rope dampening constant is exerted on the wave by the material.

It will be seen from the above that the sensor may be placed to coincide with the fixed tensioning point exterior of the level of the material or at any predefined point between this tensioning point and the level of the material, and that the response to excitation sensed by the sensor can be deducted from the oscillating frequency, wave length, amplitude etc., directly or indirectly as a function of the reflected wave from the variable level of the material.

In both instances the excitation of the rope is induced by a periodic plucking of deflection of the free portion by either mechanical means, electro-mechanical means to create a generated wave and induce a reflected wave, or by electro-magnetically exciting the ferromagnetic rope by means of a variable magnetic field such as that of passing an alternating current through an electro-magnet located about the rope. In any event the responses may be expressed as a direct measurement and indicated in analog form or indirectly measured and expressed digitally as a function, for example, of elapsed time between limits of critical features of the wave length, amplitude or frequency. The frequency can therefore be expressed in digital terms through a measurement of the time interval of the distances between the null or nodes of the exciting frequency. The analysis can be made in one instance by passing the generated and reflected rope waves, at the measuring point, through a sensor which produces a control signal for each wave. Thus the measure between the successive signals of the generated and reflected wave is proportional to twicce or double the distance between the sensor and the variable level of the material. In the method wherein the dampening of the amplitude is measured, the procedure is similar. By passing the generated and reflected wave past the sensor, the sensor can determine and prodice a control signal indicative of both. Since the dampening occurs in a uniform constant decline the reflected wave can be easily determined. The interval between these signals is also proportional to twice the distance between the sensing point and the variable level of the material.

The accuracy of the delineations according to the present invention is very great. The time units between successive control signals can be resolved electronically to such fractions that the smallest distances between the sensor and its reference points can be measured either as functions of wave lengths or functions of amplitude changes. The measured time between waves and the measured amplitude changes can be converted into either digital or analog values, which values can be correspondingly made to define distance units, which may be indicated as desired.

The present invention permits the monitoring of industrial installations having a plurality of containers in a very simple manner, employing a single computer or analyzing mechanism. Multiplex apparatus may be used from which the periodic or continuous monitoring of the several containers can be simultaneously made and which can be then individually analyzed and indicated. Preferably the computer or analyzing apparatus is provided with memory storage means synchronized and associated with each unit, so that the various successive changes etc. can be clearly indicated for each container. When periodic samplings are made, the instantaneous measured values of each unit for preferably compared with the preceeding values and stored so as to be employed in a similar later comparison with the succeeding samples. The storage means furthermore permits the output value to be obtained as the mean or even the maximum value over a given period of time. The output over a given time may be averaged or preferably only the maximum output of the response of the free rope portion to excitation is read-out in each corresponding measuring period. The periodic excitation of the rope allows the duration of the exciting period to be chosen so that the maximum value is obtained within a short defined period.

Since the rope passes through the material in the container, the material surrounding the rope effectively holds the rope and prevents that portion from vibrating. Thus only the free portion vibrates and constitutes the source from which the condition of the container is determined. It will be obvious that the rope may be a string, wire, rubber band, etc. which may be of round or square cross section of mono- or multifilament material, and/or of unbraided or braided construction. It may be preferable, however, to form the rope as a band having a width greater than its thickness to provide an enlarged face. The band can be deflected transverse to its length, so that the wide face can be vibrated to a greater degree than a more uniformly cross-sectioned rope. The band has the advantage that it is more responsive to vibration and that the oscillations produced have larger wave lengths, amplitude, etc., all capable of being more easily measured and sensed without any undue influence on the relative differences between the generated and reflected portions. The band has a further advantage in that its vibrations have greater range whether the material is light or heavy or of greater or lesser density. It is to be understood that as used in the present disclosure the term rope is generic and is intended to cover all embodiments.

This apparatus permits either the continuous or periodic obtaining of the measuring value and/or an analyzed value drived therefrom, which can be related to the empty or full condition of the container.

In employing the device to determine the resonance frequency in response to the relative oscillation of the rope, the rope may be provided with a ferro-magnetic coating, cover or portion at least in the part where it is be excited. The ferro-magnetic portion is arranged to pass through and cooperate with an electro-magnetic field -changing device whose exciting frequency is made to change between a minimum or maximum value. By subsequently matching the exciting frequency with the resonance frequency of the oscillating rope the measuring device itself defines the response of the rope. Thus the length of the free rope portion can be easily determined. Apparatus wherein the rope is a current conductor and is set within a fixed permanent magnetic field may also be used. The oscillation of the rope causes a change relatively in the period of the current between the maximum and a minimum value which induces a similar change in the output of the magnet. By matching the exciting period of the magnetic field with the resonance of the rope, the measuring device through the modified oscillation of the rope obtains the resultant corresponding period, which may be easily determined. With this latter apparatus, it is possible to provide for a continuous determination of the relative variations in rope length, since the conductor may be continuously provided with current and the responsive magnet may be continuously read.

In accordance with the present invention a device can be provided in which the free rope portion is excited to produce waves and in which the running time of these waves along the length of the free rope portion is calculated. In this arrangement the sensing device is placed at a constant, permanent position and constitutes a fixed reference point for the rope. This position may be offset from the fixed exterior tension point or may coincide with it. The rope is then excited to vibrate to generated measurable waves which run along the length of the rope to the level of the material. The wave is then reflected by the material in a harmonic or similar wave running in the contrary direction along the rope. The sensing device senses both the generated wave and the reflected wave and may calculate in terms of wave length the running time between the two. From this calculation the distance between the fixed sensing point and the actual level of the material is deducted. A variation of this device can be made in which rather than calculating the running time of the rope wave, the amplitude of the succeeding generated wave and the reflected wave is calculated. Since both the generated and reflected waves have different amplitudes, the ratio of the waves can be calculated and converted to deduct the distance between the fixed sensing point and the level of the material.

Preferably the excitation of the rope is mechanically created by arranging between the maximum level of the material and the fixed tension point above the material a striker or hammer device which can be periodically actuated to deflect the rope transverse to the direction between the exterior fixed tension point and the level of the material. The excitation of the rope can also be made electro-magnetically by inducing movement of a conductive rope in a variable magnetic field. The responses to the excitation of the rope, (i.e. the generated and reflected waves, amplitude changes etc.) may be sensed by a transducer or proximity sensor, by which the characteristics of the oscillation, wave etc. of the rope may be converted from mechanical to electrical energy such as a resistative or capacitive signal generator, photo-electric cell, etc. The variations in magnetic field, amplitude changes etc. are thus converted into an electrical signal. The transducer should preferably produce a signal of constant amplitude which is then sensed as a control for an impulse counter. Since a signal is obtained from both the generated and reflected waves, the measure between the generated and reflected control signal can be obtained. Instead of the transducer means, the sensing device can be a strain gauge from which a signal can be derived from the mechanical variations in resistance and tension of the rope. The impulse counter is a portion of a computer and analyzing device, which includes means for regulating the excitation of the rope, maintaining a correspondence between the specific periods of excitation, the transduced signal, and the determined value, either digital or analog corresponding to it. These latter means include memory storage means and means for comparing successive signals as well as read-out means. The device may be augmented even further by the use of various indicators, oral and visual signals, relay and control devices by which the refilling, emptying or other operations concerning the material and container or even the use of the material can be manually or automatically controlled and regulated.

Since various changes and modifications have been shown, it is intended that this disclosure be taken as illustrative only and not limiting in any manner of the scope of the invention.

What is claimed is:

1. The method of measuring the level of material in a container comprising the steps of locating a single elongated rope under constant tension in said material to extend between an anchor within the container and a fixed point exterior of the maximum level of said material, thereafter filling said container at least partially to provide an extending portion of said rope free of the contents thereof, exciting the free portion of said rope above the level of said material to vibrate transversely to its elongation, sensing the vibration of the free portion of the rope at a point between the fixed point and the level of said material and determining the level of material in said container as a function of the relative variation of this vibration in selected ones of resonance frequency, wave length and amplitude of said vibrations with respect to at least one of the distances between the sensing point and the level of said material, the level of said material and the anchor, and the level of said material and the fixed exterior point.

2. The method according to claim 1, wherein the rope is continuously excited and wherein the response is continuously sensed.

3. The method according to calim 1, wherein the rope is periodically excited and wherein the response is sensed in corresponding intervals.

4. The method according to claim 1, wherein the rope is placed within a variable electromagnetic field, causing the exciting frequency of the magnetic field to coincide with the resonance frequency of the rope and measuring the exciting frequency.

5. The method according to claim 4 wherein the variable electromagnetic field is provided with an exciting frequency range matched to the maximum range of frequency change of the free rope portion.

6. The method according to claim 5, including the step of measuring the resonance frequency of the free rope portion by determined the time intervals between the null nodes of the exciting frequency.

7. The method according to claim 1 including the step of arranging the sensing point offset from the exterior tensioning point and exciting the free rope portion so as to provide a succession of generated waves and waves reflected from the surface of the material in the container, sensing each wave and determining the time elapsed between a number of them, said elapsed time being indicative of the distance between the sensing point and the variable level of material.

8. The method according to claim 7, including the steps of obtaining an electrical control signal derived from successive generated and reflected waves passing the sensing point, the elapsed time between signals derived from the successive generated and reflected waves being proportionately to twice the distance from the sensing point to the variable level of the material.

9. The method according to claim 8, including the step of defining the time interval between successive signals in minute units whereby small distances may be indicated.

10. The method according to claim 1 including the step of arranging the sensing point offset from the exterior tensioning point and exciting the free rope portion so as to provide generated waves and waves reflected from the surface of the material in the container, sensing the amplitude of a generated wave and of a reflected wave, comparing said sensed amplitudes and corresponding to the dampening constant of said rope determining the distance between the sensing point and the variable level of material in the container.

11. The method according to claim 10, including the step of passing successive generated and reflected waves past the sensing point and deriving a control signal corresponding to each relative to the amplitude of the waves, the difference in amplitude between said successive signals being proportional to twice the distance from the sensing point to the variable level of the material.

12. The method according to claim 11 including the step of defining the ratio between amplitudes in minute units whereby small distances may be indicated.

13. The method according to claim 1 including the steps of indicating the response digitally.

14. The method according to claim 1 including the step of indicating the responses as an analog.

15. The method according to claim 1 wherein a plurality of sensing points each associated with a container have their outputs successively fed through a timed multiplex system to individual indicator wherein the values are correspondingly displayed.

16. The method according to claim 15, wherein said indicators include storage means for retaining successive values.

17. The method according to claim 16 including the step of synchronizing the periodic obtaining of the sensed value with a periodically functioning stepping switch.

18. The method according to claim 17, including the step of tuning the output time of each sensing point to the measuring duraction of the corresponding maximum free rope portion.

19. The method according to claim 18 wherein the duration of the exciting period is selected greater than the given output time of the maximum free rope portion.

20. The method according to claim 19 including the step or arranging the rope so that the portion thereof exterior of the container is held fast whereby the length between the full condition of the container itself.

21. Apparatus for measuring the level of material in a container comprising a single rope, means for anchoring one end of said rope in the bottom wall of said container, and means for fastening the other end of said rope exterior of said container above the top thereof, means for maintaining said rope under constant tension, said rope passing through the material located in said container, said material surrounding a portion of said rope and leaving a portion thereof between the surface of the material and the exterior fastening means free, means for exciting the free rope portion between the exterior fastening point and the level of said material to vibrate transversely of its length, sensing means positioned adjacent said free rope portion for sensing the vibrations generated by rope in response to said excitement means and means for determining the level of material in said container as a function of the relative variations of this response in selected ones of resonance frequency, wave length and amplitude of said vibrations with respect to at least one of the distances between said sensing means and the level of said material, the level of said material and the anchoring point within said container and the level of said material and the exterior fastening point.

22. The apparatus according to claim 21, including means for periodically exciting the free rope portion and means for controlling the sensing and determination of the response in periodic intervals corresponding thereto.

23. The apparatus according to claim 21, wherein a portion of said rope is provided with ferromagnetic means and is set with a variable electromagnetic field, said electromagnetic means including means for causing the field frequency to correspond to the resonance frequency of the excited rope and means for determining the field frequency.

24. The apparatus according to claim 21 wherein the means for exciting the rope comprises a hammer adapted to strike the rope transversely of its direction of tensioning.

25. The apparatus according to claim 21 wherein the sensing means comprises an inductive transducer providing an electrically controlled impulse of constant amplitude and the determining means comprises a timing generator and stepping register controlled thereby.

26. The apparatus according to claim 21 including means for indicating the determined relative variations in level.

27. The apparatus according to claim 21 including means responsive to the determined relative variations for controlling the filling or emptying of said container.

* * * * *